United States Patent [19]

Kaufman et al.

[11] 4,186,727
[45] Feb. 5, 1980

[54] AIR VENTILATION AND WASHING SYSTEM

[75] Inventors: Arnold S. Kaufman, Studio City; Robert L. Anderson, Reseda, both of Calif.

[73] Assignee: National Food Service Equipment Fabricators, Inc., Glendale, Calif.

[21] Appl. No.: 807,917

[22] Filed: Jun. 20, 1977

Related U.S. Application Data

[63] Continuation-in-part of Ser. No. 652,484, Jan. 26, 1976, Pat. No. 4,085,735.

[51] Int. Cl.² ............... F21C 15/08; F23J 11/00
[52] U.S. Cl. ............................... 126/299 D; 55/DIG. 36
[58] Field of Search ............... 126/299 D, 299 E; 55/DIG. 36

[56] References Cited

U.S. PATENT DOCUMENTS

| | | | |
|---|---|---|---|
| 3,278,114 | 10/1966 | Gibbs | 126/299 D |
| 3,457,850 | 7/1969 | Sweet et al. | 126/299 D |
| 3,500,740 | 3/1970 | Aubrey | 126/299 D |
| 3,664,255 | 5/1972 | Kuechler | 126/299 D |
| 3,955,949 | 5/1976 | Rohrer | 126/299 D |
| 3,978,777 | 9/1976 | Nett | 126/299 D |

*Primary Examiner*—Ronald C. Capossela
*Attorney, Agent, or Firm*—Subkow and Kriegel

[57] ABSTRACT

An air ventilation and washing system for extracting noxious or other impure air, such as is present above the cooking surface of a stove having automatically activated electrical and mechanical fire control apparatus selectively responsive to changes in temperature is disclosed. The air ventilation system has a hood structure providing a make-up air distribution plenum through which air is distributed and pressurized for equal distribution of make-up air along the length of the hood structure. A vortex baffle is provided in the hood between a make-up air cavity and an exhaust cavity to cause efficient mixing of room air and make-up air from the exterior, while protecting personnel from exposure to the exterior make-up air, and a vortex chamber causes the mixing of the make-up air and room air with contaminated air from the stove.

20 Claims, 14 Drawing Figures

AIR VENTILATION AND WASHING SYSTEM

CROSS REFERENCE TO RELATED APPLICATION

This application is a continuation-in-part of our application Ser. No. 652,484, filed Jan. 26, 1976 for "Air Ventilation and Washing System" now U.S. Pat. No. 4,085,735.

BACKGROUND OF THE INVENTION

The present invention relates to air ventilation and washing systems and in particular an air ventilation system for removing grease laden air produced as the result of cooking, and a washing system for cleaning any accumulation of grease within the system.

In commercial cooking establishments where large quantities of food are cooked on an open stove or on hot grills, large amounts of air contaminated with grease is produced. For reasons of health, safety and cleanliness, the heated grease laden air must be evacuated from within the room.

The early method of removing the undesirable air was merely to have a massive exhaust fan located in the ceiling or wall pull out the contaminated air from within the room. It was very soon recognized, however, that replacement air was required to be blown into the room in order to replace the air drawn out by the exhaust fan.

Such arrangements were undesirable for a number of reasons, including the most obvious reason that any chef working in the kitchen would be subjected to enormous drafts of hot and cold air. A further disadvantage of such systems was the great expense associated with the heating or cooling requirements of the kitchen. For example, any attempt to air condition the kitchen during the summertime would require a massive cooling system to maintain the temperature due to the fact that the cooled air would be almost immediately withdrawn from the room by the exhaust fan. Comparable difficulties would be encountered during the cold season when the heated air would be removed from the room to be replaced by frigid outside air.

In recognition of the aforementioned disadvantages, air ventilation systems were devised which first forced a curtain of outside air over the cooking surface of the stove and then withdrew a mixture of the outside air and the inside air. Such ventilator systems are known as "air curtain ventilator systems", such as disclosed in the patent to Sweet, et al., U.S. Pat. No. 3,457,850, issued July 29, 1969.

In such systems, as indicated by their nomenclature "air curtain ventilator", a "curtain" of air was formed by forcing the outside air through a relatively narrow, substantially horizontally oriented opening so as to create a horizontal curtain of air over the exhaust or vapor collection chamber. Such a system is partially ineffective in removing contaminated air not immediately above the cooking surface.

Providing an exhaust system for removing the grease laden air above the stove, while solving one problem, created additional problems. As indicated above, the air above a kitchen stove, especially in a commercial establishment such as a restaurant, is heavily contaminated with grease from the foods being cooked. The collection of any quantities of grease presents a highly volatile source of fire. Grease filters located in the air exhaust system may remove a large quantity of the grease. The grease filter is periodically removed and either cleaned or replaced by a new grease filter.

The grease filter, however, does not remove all of the grease from the air, some of the grease passing through the filter and condensing on the surfaces of the grease duct and on the exhaust fan. The collection of the grease in a normally inaccessible area, in association with the high temperatures generated by the cooking surface, created a fire hazard.

The grease collected within the grease duct is such that they must be thoroughly cleaned, depending upon their use, every three months. Due to the general inaccessibility of the grease ducts, the manual cleaning of the ducts is costly and highly inefficient. Large collections of grease may remain in the ducts for many weeks at a time. During such times the grease duct and other equipment are highly susceptible to fire. More frequent manual cleanings of the duct, however, is prohibitively expensive.

Recognition of the potential fire hazard presented by grease accumulations in the grease duct and the undesirability of having the ducts manually cleaned led to the development of automatic duct cleaning devices such as disclosed in the patent to Lawson, U.S. Pat. No. 3,795,181, issued Mar. 5, 1974. Such an automatic duct cleaning device forced hot water and a cleaning solution through a number of rotating spraying outlets on a hollow tube by the use of a fluid forcing device in order to spray the inside surfaces of the duct. The cleaning solution would homogenize the grease on the surfaces of the duct which would then flow down the sidewalls of the duct to be collected in a grease trap or other receptacle. Upon the completion of the washing cycle, the water and cleaning solution within the hollow tube would, under the force of gravity, collect within the housing of the means for forcing the cleaning fluid through the outlets. In periods of extreme cold, the water and cleaning solution would freeze, rendering the cleaning system inoperable.

While the automatic duct cleaning device of Lawson went a long way towards reducing the possibility of a fire occurring within the grease duct, such a possibility was not completely eliminated. Under certain circumstances grease might still collect in the duct, such as between washings, should the interval between washings be too long or should the washing equipment become inoperative and not be promptly fixed.

Chemical fire extinguisher systems conventionally located suspended from the vapor collection chamber above the cooking surface, responsive to excessive heat on the cooking surface, have been used. Ordinarily such fire extinguishing systems would not be activated by heat generated within the grease duct unless there was a substantial fire actively present within the duct. In any event, such a fire extinguishing system would serve only to extinguish the fire in the vicinity of the cooking and would have no effect on any fire within the air ventilation system.

The "air curtain" ventilators, such as identified above, have been partially or wholly unsatisfactory because they are so constructed that they cannot be installed in existing building structures or in new building structures without provision of large space between the ceiling and the room for the replacement or "make-up" air distribution baffles and hood structures. The low pressure, uniform distribution of external make-up air and mixing thereof with room air and with contaminated air just above the stove or grill have also posed contamination problems.

SUMMARY OF THE INVENTION

In the present invention, an automatic duct cleaning device is disclosed in which the spraying outlets for the hot water and cleaning fluid are located below the fluid driving system thereby avoiding the possibility of trapped water freezing in the pipe within the cleaning system. In addition, a mechanical and a temperature controlled electircal fire extinguishing system is incorporated within the design of the duct washing system responsive to excess heat being generated within the exhaust duct network. In the preferred embodiment of the invention, two independent conditions serve to activate each of the fire extinguishing systems. The first condition for activating the electrical temperature controlled fire extinguishing system is the presence of relatively low temperature, in the order of 200° F. The precise temperature desired may be varied. Upon the selected temperature being reached, a temperature sensitive device, such as a thermostat, will automatically activate the washing cycle of the cleaning system. The washing detergent throughout the exhaust grease duct, will continue until the temperature at the entry of the exhaust duct sensed by the temperature controlled electrical device is less than the preselected temperature. Such a fire extinguishing system is fully automatic and does not require the resetting of the system.

The second fire extinguishing system is a mechanical fire extinguishing system, requiring no electrical power. Should there be a loss of electrical power due to a fire or any other reason, the mechanical fire extinguishing system continues to operate. It is intended that the mechanical fire extinguishing system be activated at a substantially higher temperature than that of the temperature controlled fire extinguishing system, such as approximately 350° F. It is further contemplated that once the mechanical fire extinguishing system is activated, that it would remain activated until manually disconnected, regardless of the drop in temperature within the exhaust grease duct.

In addition, the present invention provides an improved air ventilation system to more efficiently withdraw contaminated air by the appropriate positioning of the exhaust hood and the outside air intake hood.

Further, the invention provides an air ventilation system with improved air distribution and mixing characteristics. Ambient make-up air is supplied to the make-up air plenum, and distributed to the exhaust cavity, after mixing with room air and contaminated air above the cooking surface, in an improved and more efficient manner, whereby the ambient make-up air from the exterior does not contact personell working below the hood or food or cooking surfaces below the hood. In addition, the make-up air is exhausted with the contaminated air in such a manner as to avoid turbulence and escape of contaminated air from the exhaust collector cavity. The length of the hood can be varied without affecting the efficiency, and the hood can be easily installed in building structures of limited space, without great modification. Moreover, the air distribution is self-balancing, without requiring adjustment after installation.

It is an object of the invention to provide an improved air ventilation and washing system in which the washing apparatus is more reliable.

It is a further object of the present invention to provide an air ventilation and washing system which provides more efficient withdrawal of contaminated air.

A further object of the present invention is to provide an improved air ventilation and washing system having a mechanical fire extinguishing system.

It is a further object of the present invention to provide an air ventilation and washing system having an improved fire extinguishing system which is electrically controlled.

It is a further object of the invention to provide an air ventilation hood having improved air distribution Another object of the invention is to provide an improved air ventilation hood with better makeup air and contaminated air mixing and exhaust flow characteristics.

These and other objects and advantages of the present invention will be evident from a review of the following detailed description of the invention and of the accompanying drawings.

BRIEF DESCRIPTION OF THE DRAWINGS

In the drawings:

FIG. 7 is a schematic horizontal section showing the interfit between the air distribution panels.

DETAILED DESCRIPTION OF THE DRAWINGS

Figure 1:
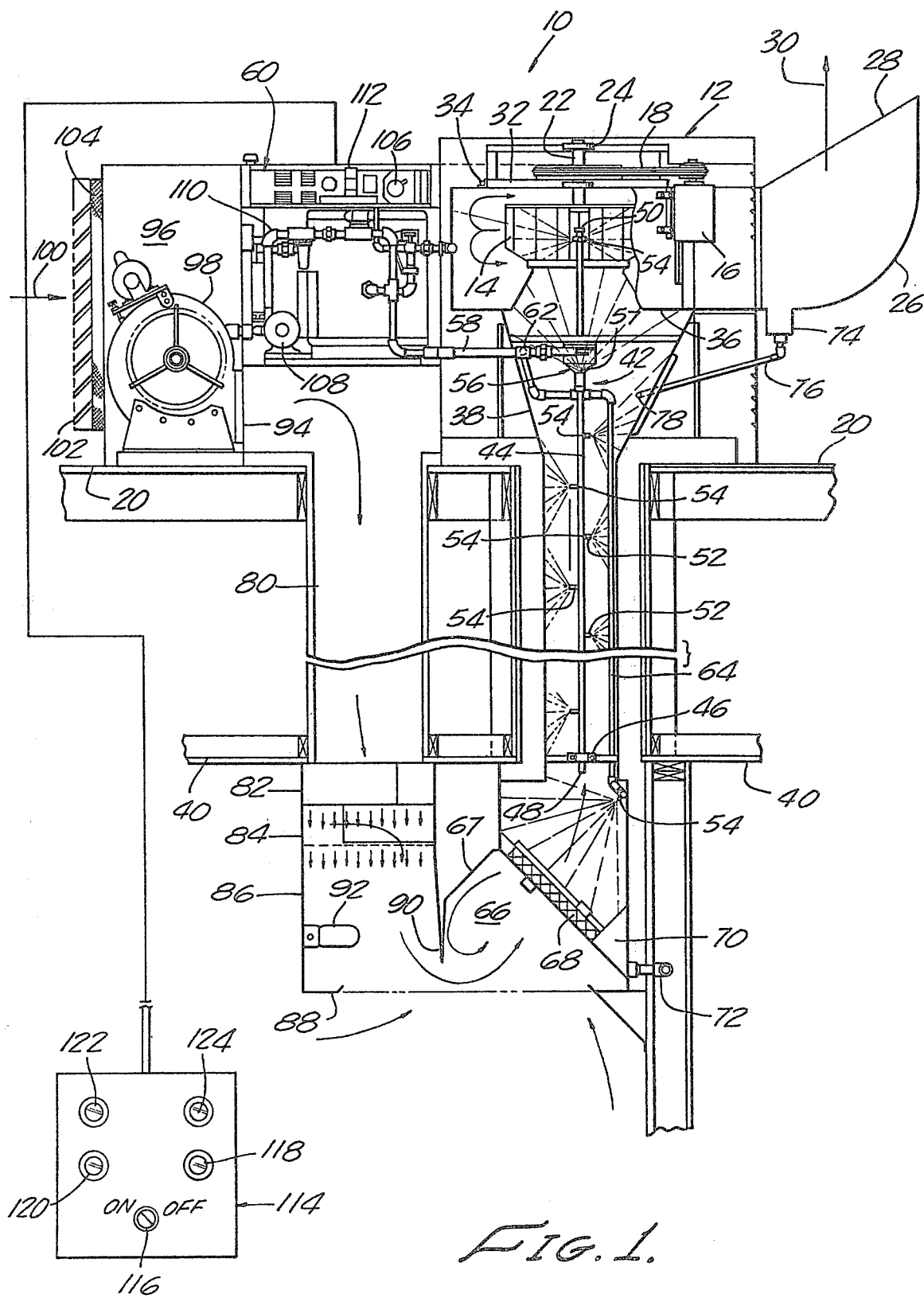
FIG. 1 is a cross-sectional side view of the improved air ventilation and washing system, including one form of air distribution system.

Referring to FIG. 1, a cross-sectional side view of the ventilation and washing system 10 is shown. A hollow rectangular air box 12 mounted on roof 20 contains the air exhaust fan 14 which is powered by exhaust fan motor 16 by means of fan belt 18. In the preferred embodiment of the invention the air exhaust fan 14 has an annulus shape and is mounted with the longitudinal axis of the opening of the annulus perpendicular to the roof 20 of the building. The air exhaust fan 14 is supported by shaft 22 and bearings 24. The exhaust fan 14 including shaft 22 and bearings 24 are supported upon fan base plate 32 pivotably mounted to one edge 34 of the base plate so that upon disconnection of fanbelt 18 the fan base plate 32, air exhaust fan 14, shaft 22 and bearings 24 may be rotated 90° about said edge thereby permitting access to the inside of the air box 12 and to the air exhaust fan 14.

A discharge elbow 26 is mounted at an opening at one end of the air box 12. The discharge elbow 26 has one opened surface 28 directed generally upwardly to permit the exiting of the exhausted air 30. The air box 12 also has an opening 36 in the bottom surface thereof from which depends the gradually narrowing grease duct 38 surrounding the opening 36. While in the preferred embodiment of the present invention the opening 36 is generally square in shape and the upper portion of grease duct forms a truncated regular pyramid, it is contemplated that other shaped openings and configurations, such as rectangular and circular grease ducts could be used.

The grease duct 38 gradually narrows thereby decreasing the cross-sectional area of the grease duct until a point in the vicinity of the roof 20 is reached. From the roof 20 to the ceiling 40 the grease duct 38 maintains approximately the same dimensions although it is recognized that a slight inwardly directed slope may be imparted to the grease duct 38 from the roof to the ceiling 40. The grease duct 38 has connected to its lower end opposite the plurality of grease filters 68 an exhaust hood 66, extending substantially the length of cooking surface.

The washing system 42 comprising a hollow tubular member 44 rotatably mounted upon bearing 46 mounted to the walls of the grease duct is located positioned substantially along the longitudinal axis of the grease duct 38. The hollow tubular member 44 is closed at both ends 48 and 50. A plurality of apertures 52 terminating in spraying heads 54 directed perpendicular to the tubular member 44 are located along the tubular member 44. One of the apertures 52 and sprayheads 54 extending from the tubular member 44 is located proximate the end 50 of the tubular member 44 within the opening of the air exhaust fan 14.

Located intermediate the ends 48 and 50 of the hollow tubular member 44 is a fluid turbine member 56, such as disclosed in the patent to Lawson, U.S. Pat. No. 3,795,181, for forcing fluid through the spraying heads 54 while rotating the hollow member 44. The substantially conical top wall 57 of the fluid turbine member 56 is directed downwardly. The fluid turbine member 56 is connected to a source of water and cleaning fluid from entrance pipe 58.

Extending from a joint 62 in entrance pipe 58 is a second pipe 64 which extends along a surface of the grease duct 38 to a point below the ceiling 40 terminating in a sprayhead 54. The sprayhead 54 is positioned so as to spray the interior surfaces of the lower portion of case duct 38 and the internal side of the grease filter 68.

A grease receptor 70 is located at the lower portion of the grease duct 38 below the grease filter. A drain 72 from the grease receptor 70 leads to an appropriate grease collection facility.

The discharge elbow 26 has along its bottom surface a grease trough 74 comprising a recessed portion with an opening therein connected by pipe 76 having its other opening 78 terminating within the upper segment of grease duct 38.

Located substantially parallel to the grease duct 38 is a rectangular makeup air duct 80 located between the roof 20 and the ceiling 40. The makeup duct 80 extends above the roof 20 and has an opening 94 into a makeup air supply compartment 96. A makeup air supply fan 98 is located within the makeup air supply fan compartment 96 for forcing supply air 100 from the outside environment through the makeup air duct 80 into the makeup hood 86. Weather louvers 102 and filters 104 located across one surface of the makeup air supply fan compartment 96 permit filtered air to flow to the makeup air supply fan 98.

In the form shown in FIG. 1, hood makeup air plenums 82 and 84 are located below the makeup air duct 80 and above the air makeup hood 86 and provide a uniform flow of makeup air within the makeup hood 86. The makeup hood 86 extending substantially the length of the cooking surface has a lower inwardly directed lip 88 substantially at the level of the bottom of the exhaust hood 66. The makeup hood 86 and the exhaust hood 66 are separated by a downwardly projecting dividing member 90 which is substantially vertical on the side of the member facing the makeup hood 86 and is upwardly and inwardly slanted on the side of the divider member 90 creating a baffle plate 67 in the exhaust hood 66. Vapor proof lights 92 may be provided in the exhaust hood 66.

Also located within a compartment of the air box 12 is the washing system network 110 control panel 60 for controlling the operation of the makeup air supply fan 98 and the washing system 42. The control panel 60 may contain a clock 106 for controlling the starting, stopping and duration of the washing cycle of the washing system 42. Contained in the washing system network 110 is a water or fluid pump 108 for pumping fluid through the washing assembly network containing detergent fill, water heating control and other related apparatus, terminating at entrance pipe 58.

The control panel 60 also contains a thermostat 112 responsive to the temperature at the exhaust hood 66. The sensors for the thermostat are positioned at the exhaust hood 66 may be controlled by any temperature sensing device. The thermostat 112 may be set at any desired temperature level. In the preferred embodiment, however, it is intended that the temperature be set at approximately 200° F. Upon the thermostat reaching the desired level the thermostat serves to electrically activate pump 108 thereby instituting the washing cycle of washing system 42 so long as the temperature at the exhaust duct 66 remains above the predetermined temperature.

Electrically connected to the control panel 60 is a remote panel 114 for indicating the operating mode of the washing system 42. The remote panel 114 may also have switching means 116 such as a toggle on/off switch for turning the washing system 42 on and off manually. A start switch 118 for starting the normal wash cycle is also provided. Indicator lights 120, 122 and 124 for indicating the operating function of the wash circuit, the heater circuit and the detergent level, respectively, or any other desired function of the system may also be provided.

Figure 2:
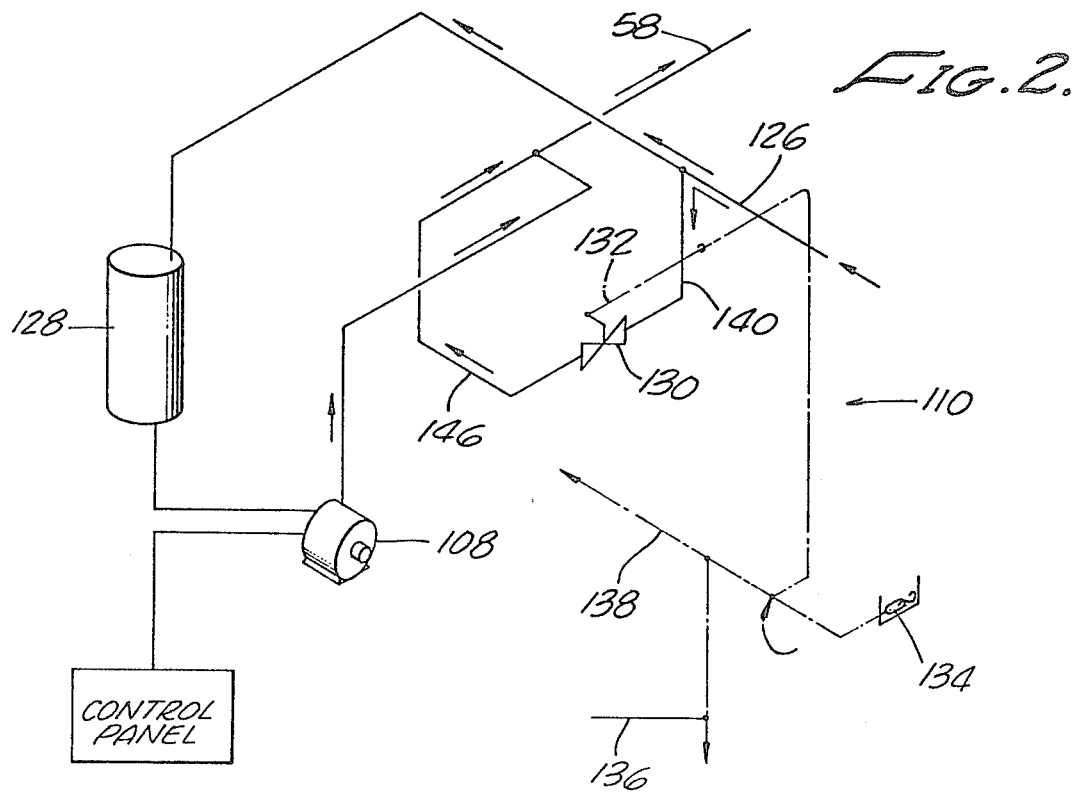
FIG. 2 is a diagramatic view of the mechanical fire extinguishing system.

Referring to FIG. 2, a diagramatic view of the piping for the washing system network 110 is shown. Cold water from a city water supply is introduced through the cold water inlet 126 into the water heater 128. From the water heater 128 the water is then pumped by pump 108 through entrance pipe 58 to the fluid turbine member 56 where it is sprayed through sprayheads 54 on the grease duct 38.

A normally closed spring loaded mechanical valve 130 is inserted between the cold water inlet pipe 126 and entry pipe 58 bypassing the water heater 128 and pump 108. The valve 130 is maintained in normally closed position by a connecting means such as wire 132 under tension connected to a fusible link 134 mounted at the exhaust hood entry 66. The wire 132 is also maintained under tension by the connections to the cooking equipment 136 and a manual control 138.

Upon relief of the tension on wire 132 the cold water entering inlet pipe 126 passes directly through valve 130 and into entrance pipe 58 thereby spraying the grease duct 38. The water will continue to be sprayed on the grease duct 38 until the mechanical valve 130 is again physically closed, thereby preventing the bypass of the water heater 128 and the water pump 108.

Figure 3:
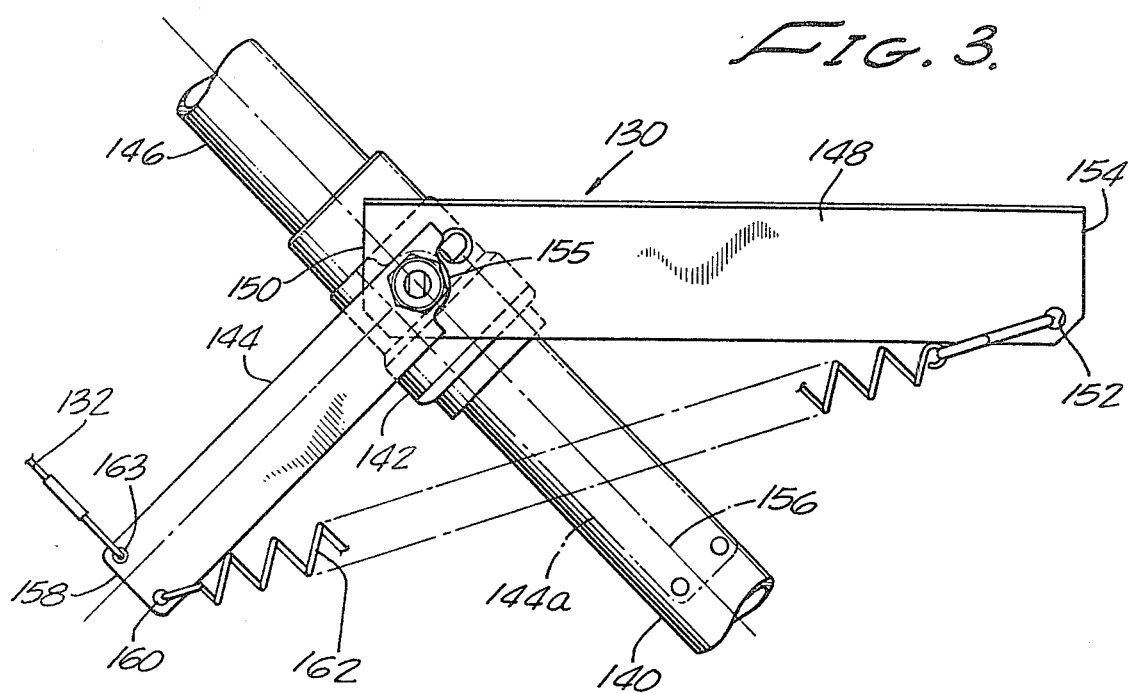
FIG. 3 is a top perspective view of the mechanical fire system valve assembly.

Referring to FIG. 3, a top view of the mechanical valve system 130 is shown in greater detail. In FIG. 3, cold water bypass inlet line 140 enters valve juncture 142. Valve juncture 142 has a conventional valve, now shown, contained therein. The position of the valve is controlled by elongated valve control arm 144. When the valve control arm 144 is in a position substantially perpendicular to the axis of the valve juncture the valve is in a closed position so that water may not pass through the valve juncture 142. When the valve arm 144 is in a position in substantial alignment with the axis of the valve juncture the valve is in an open position and water may pass through cold water bypass inlet line 140, the valve juncture 142 and bypass water line 146 to entrance pipe 58.

An elongated valve spring loading arm 148 is permanently fixed at one end 150 to valve juncture 142 and has an opening 152 at its other end 154. The valve spring loading arm 148 is positioned so that its other end 154 is on the opposite side of the axis 156 of the valve juncture 142 from the axis of elongated valve arm 144.

One end 155 of elongated valve control arm 144 is pivotably mounted to the valve juncture so as to open and close the valve when rotated. The other end 158 of the elongated valve control arm 144 has a first opening 160 and a second opening 162 in it. A spring 162 is connected between the first opening 160 and the opening 152 in the valve spring loading arm 148 thereby tending to move the valve control arm 144 from its position shown in solid lines in which the valve within valve juncture 142 is normally closed to a position such as shown by dotted lines 144a so that the valve within valve juncture 142 is in an open position thereby permitting passage of water through the valve juncture.

Connected to the opening 163 in the end 158 of the valve control arm is wire 132 which is connected to the fusable link 134 mounted at the entrance of exhaust hood 66 such as shown in FIG. 2. The tension in wire 132 is sufficient to overcome the force of spring 162 attempting to move valve control arm 144 into a position such as shown by dotted line 144a in order to open the normally closed valve in the valve juncture 142. As long as tension is maintained in wire 132 sufficient to overcome the force of spring 162 no water will be permitted to bypass the water heater and pump in order to enter entrance pipe 58 to the washing system 42. However, upon release of tension upon 132, either by the breaking of fusible link 134 due to temperatures in excess of approximately 360° F. or the manual release of the tension on wire 132, spring 162 will pull the valve control arm to its position indicated by dotted lines 144a thereby opening the valve in valve juncture 142 permitting cold water to enter cold water bypass inlet line 140 directly to entrance pipe 58 for spraying water in the grease duct 38.

Cold water without detergent will continue to be sprayed within the grease duct 38 until the mechanical valve 130 is manually returned to its normally closed position or the water from the city supply to cold water inlet 126 is shut off. Thus, the mechanical fire extinguishing valve 130 is independent of the electrical system and will continue to operate regardless of termination of electrical power which might result from a fire.

While one embodiment of the mechanical fire extinguisher has been described in detail, it is recognized that other bypass control systems may be devised in which a valve contained in a bypass network is in a normally closed position, at one temperature and by either electrical or mechanical means is opened at another temperature or condition. For example, the bypass valve 130 may be opened by a spring loaded gate valve or even an electric motor. Such devices do not depart from the scope of the present invention.

In operation of the air ventilation system the makeup air supply fan 98 pumps supply air through the makeup duct 80 and through hood makeup air plenums 82 and 84. A vertically slow moving, uniformly distributed layer of air is then introduced into the makeup hood 86. At the same time, exhaust fan 14 is rotating so as to create an upward draft of air through the filter 68 and up through the grease duct 38 exhausting through the upwardly open surface 28 of the discharge elbow 26.

Figure 4:
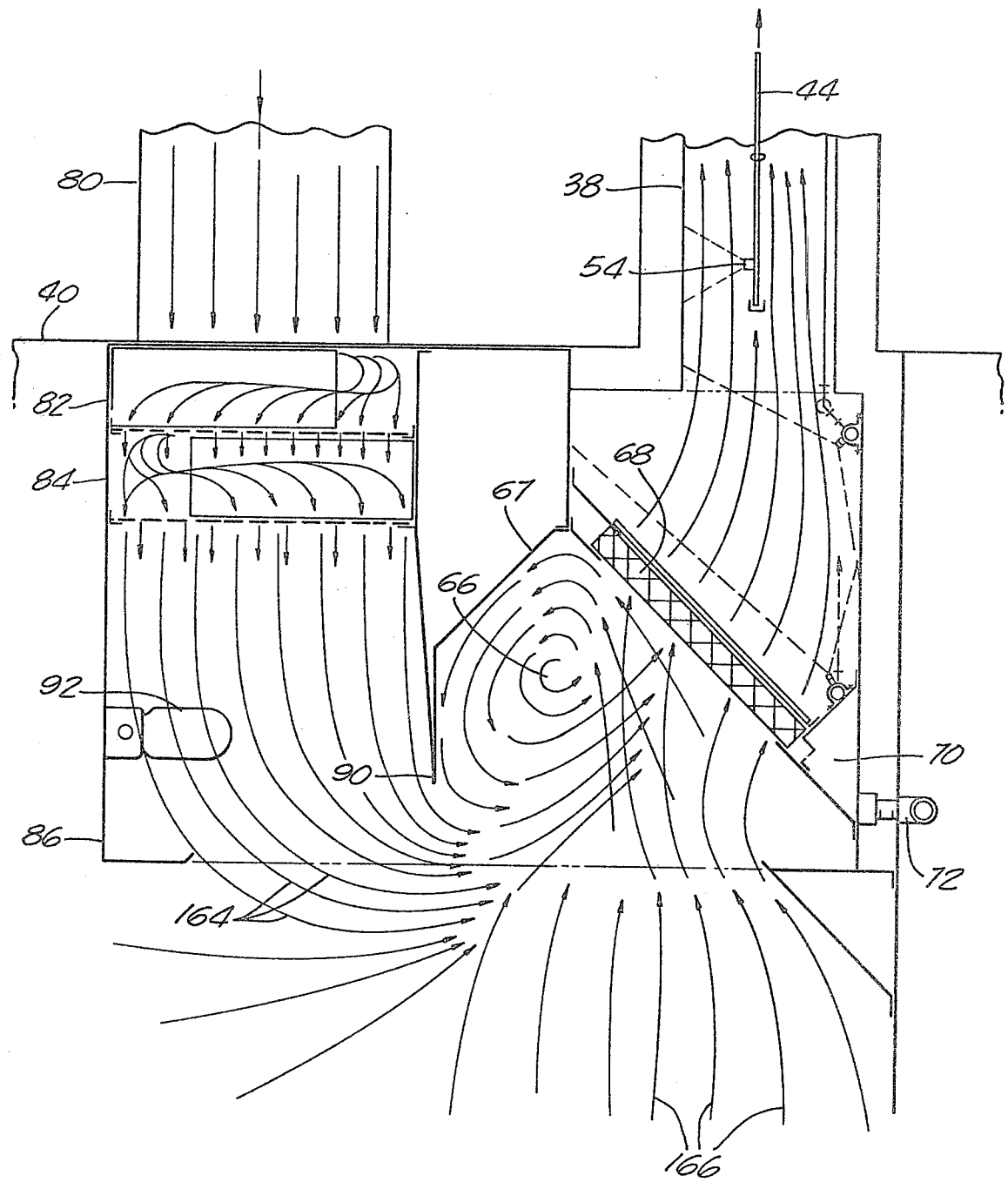
FIG. 4 is a diagramatic view illustrating the air currents in the improved ventilation system of FIG. 6.

Referring to FIG. 4, the air flow is shown within the makeup hood 86 and the exhaust hood 66, which are approximately of the same length as the cooking stove or work areas. The uniform layer of makeup air 164 enters the makeup hood 86 in a generally vertical orientation until it decends below the divider member 90. At such time the uniform layer of makeup air 164 is drawn by exhaust fan from within the makeup hood 86 into the exhaust hood 66 where it mixes with contaminated air 166. The dividing member 90 separating the exhaust hood 66 from the makeup hood 86 prevents the makeup air from entering the exhaust hood 66 until a substantial portion of the makeup air 164 has exited from the makeup hood and has entered the room thereby increasing the volume of air in the room that mixes with the makeup air and in particular with the contaminated air. The exhaust hood 66 has a baffle 67 segment which causes the upwardly rising contaminated air 166 which strikes the baffle segment 67 to be deflected downwardly resulting in the further mixing of the makeup air 164 with the contaminated air 166 before being drawn through filter 68. Such mixing serves to provide a greater opportunity for the condensation of the grease within the contaminated air 166 so as to increase the amount of grease trapped by filter 68 rather than be deposited on the walls of the grease duct 38.

While the preferred embodiment of the present invention has been described in detail, it is recognized that other variations may be devised which are intended to be within the concept of the invention as described.

In the embodiment of the invention as described above, the distribution of air from the makeup air duct 80 through the makeup air plenums 82 and 84 and the flow of air, as diagrammed in FIG. 4 downwardly about the dividing member 90 into the exhaust hood 66, where the makeup air is mixed with a small percentage of air from the room to make up the total volume of exhaust air, as the exhaust air passes through the filter 68 and mixes with the contaminated air along the length of the hood has provided a pattern of air flow which is far superior to the air screen-type exhaust apparatus of the prior art. In part, this is attributable to the arrangement of the makeup air plenums 82 and 84 which, as seen in FIG. 4, comprise vertical spaced perforated plates and intermediate vertical baffles which cause the air to travel in a tortuous path along the length of the makeup air plenums, thereby distributing the air and, as has been found in the case of some makeup hood air lengths, causing a pressurization of the air in the makeup plenums so that an even flow of makeup air is caused to flow downwardly about the divider wall 90 to the vortex region of the exhaust air chamber along the entire length thereof.

Referring to FIGS. 5 through 13, a form of the hood structure is illustrated, which without requiring further illustration or detailed description of the more comprehensive apparatus above the roof 20 or a more detailed description of the washing and fire extinguishing system described above, results in further improvements in the distribution of air. In any event, makeup air is delivered through the makeup air duct 80, as previously described via the roof mounted fan and is discharged through the exhaust duct 38 via the discharge fan on the roof. The hood structure of FIGS. 5 through 13 enables the use of ambient makeup air from the outside which is not required to be heated or cooled, since the exterior makeup air, which replenishes the large volume of exhaust air, does not come into contact or effect the personel working at the stove or range below the hood or the food preparation surfaces. Therefore, the system is efficient and effects energy savings, while, nevertheless, meeting the requirements of the governmental agencies and the codes governing the operation of such exhaust equipment in public places. In the operation of the hood structure, the greater proportion of the air being exhausted is replaced by the makeup air delivered into the exhaust chamber without heating or cooling, at a relatively low velocity but directionally and evenly distributed along the full length of the hood. Not only does the makeup air supplied through the makeup air duct to the exhaust chamber not contact workers below the hood or the food or cooking surfaces below the hood, but such makeup air flow does not create turbulence that might otherwise cause contaminated air to be forced from the exhaust chamber; the ability of the hood to capture and remove contaminated air laden with grease and smoke is not affected; the length of the hood may be varied substantially without requiring a change in the general configuration of the hood structure or affecting the efficiency thereof; and installation of the hood and the single makeup air duct and single exhaust air duct can be easily accomplished, in most cases, without significant modification of the roof or ceiling structure, since air distribution is accomplished within the hood structure, essentially below the ceiling. A further advantage of the hood structure is that the air flow is balanced by simple adjustment of the speed of the respective fans or blowers to vary air flow in the respective makeup section and exhaust section of the hood structure to suit a particular installation. Thereafter, no further adjustments are necessary.

Figure 5:
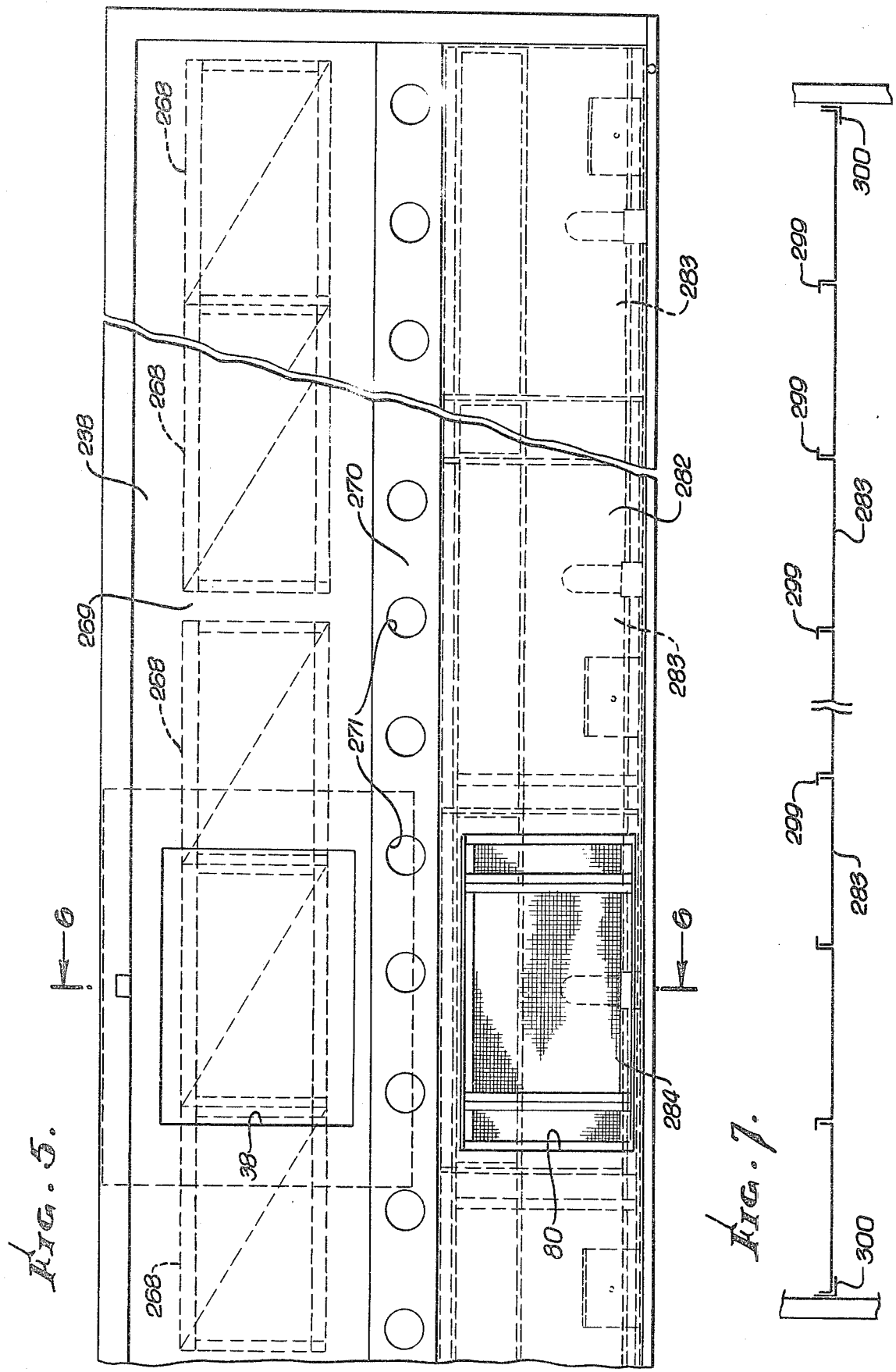
FIG. 5 is a partial plan view of the hood structure, just below the ceiling.

FIG. 5 is a view looking downwardly on top of the exhaust air plenum 238, from which air passes throughout its length into the exhaust air duct 38, and upon the makeup air plenum 282, to which makeup air is supplied from the exterior of the building to the makeup duct 80. Within the exhaust plenum 238 are a series of longitudinally extended grease filters 268 arranged end to end and appropriately spaced by mullions 268. These grease filters correspond to the filter 68 previously described. Along the central region of the hood is a panel 270 having appropriately spaced access openings 271. The makeup air plenum 282 contains a series of makeup air panels 283 which are spaced end to end along the length of the makeup hood plenum below a makeup air diffuser 284 mounted in the plenum beneath the makeup air duct 80.

Figure 6:
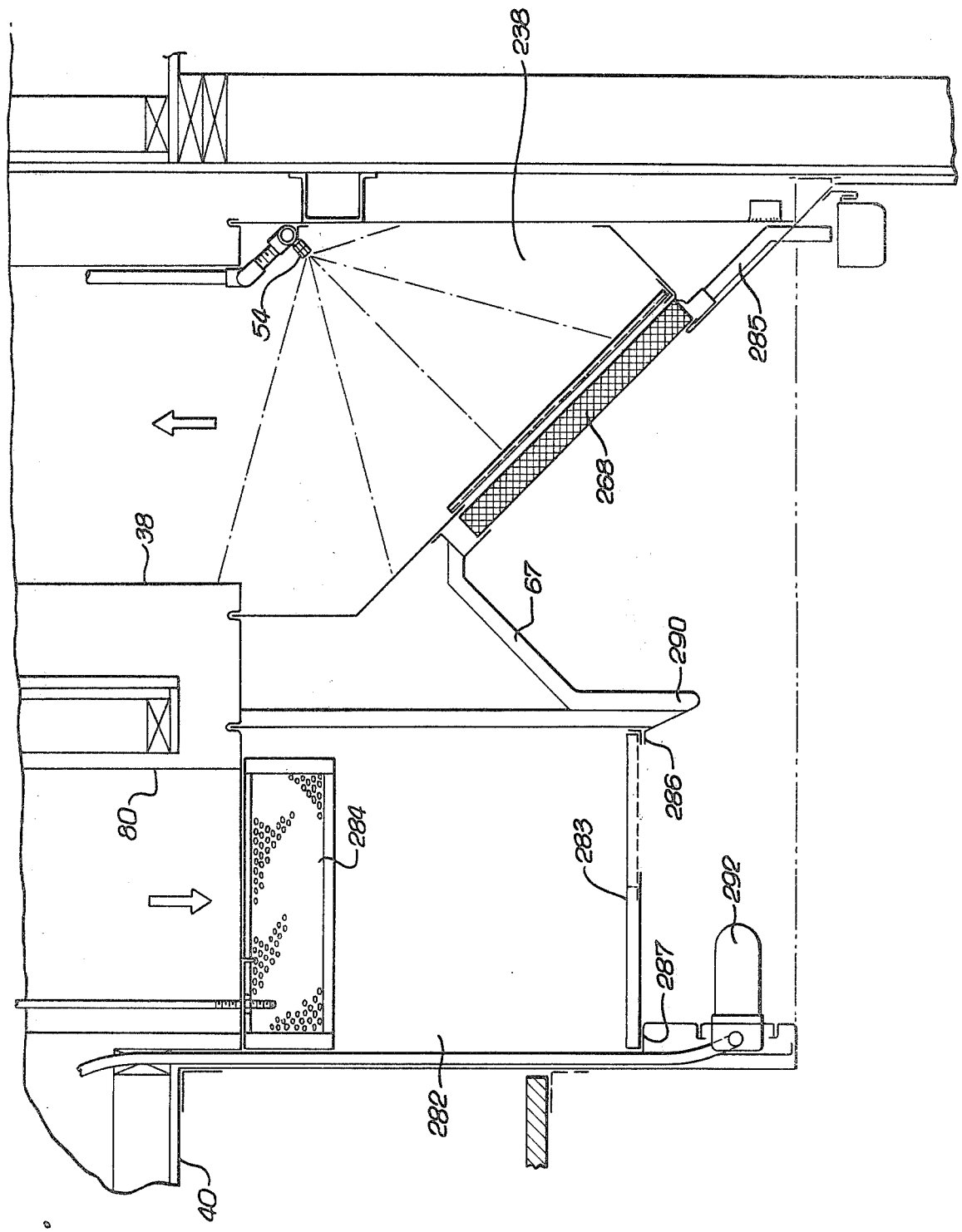
FIG. 6 is a transverse, vertical section on the line 6—6 of FIG. 5.

As seen in FIG. 6, the filter screens 268, which are adapted to remove a certain amount of grease from the contaminated air exhausted to the exhaust plenum 238, are, as before, suitably mounted in channel supports so as to be inclined and bridge the space from the oppositely inclined vortex baffle wall 67 and the back of the hood. Grease can be discharged from the filters 268 through a suitable collector system 285, adapted to also collect the fluid emanating from the spray nozzle 54. The air distribution panels 283 are suitably supported on opposite ledges 286 and 287, provided on the inside of the makeup air plenum 282, a short distance above the lower end of the divider member or wall 290, and on the other side of the makeup air plenum along the upper surface of the housing for the vapor-proof lights 292. The makeup air diffuser 284, through which air is admitted to the makeup air plenum 282 from the supply duct 80, is suitably supported beneath the makeup air duct and is adapted to cause the deflection or diffusion of the air downwardly and longitudinally of the makeup air plenum.

Figure 8:
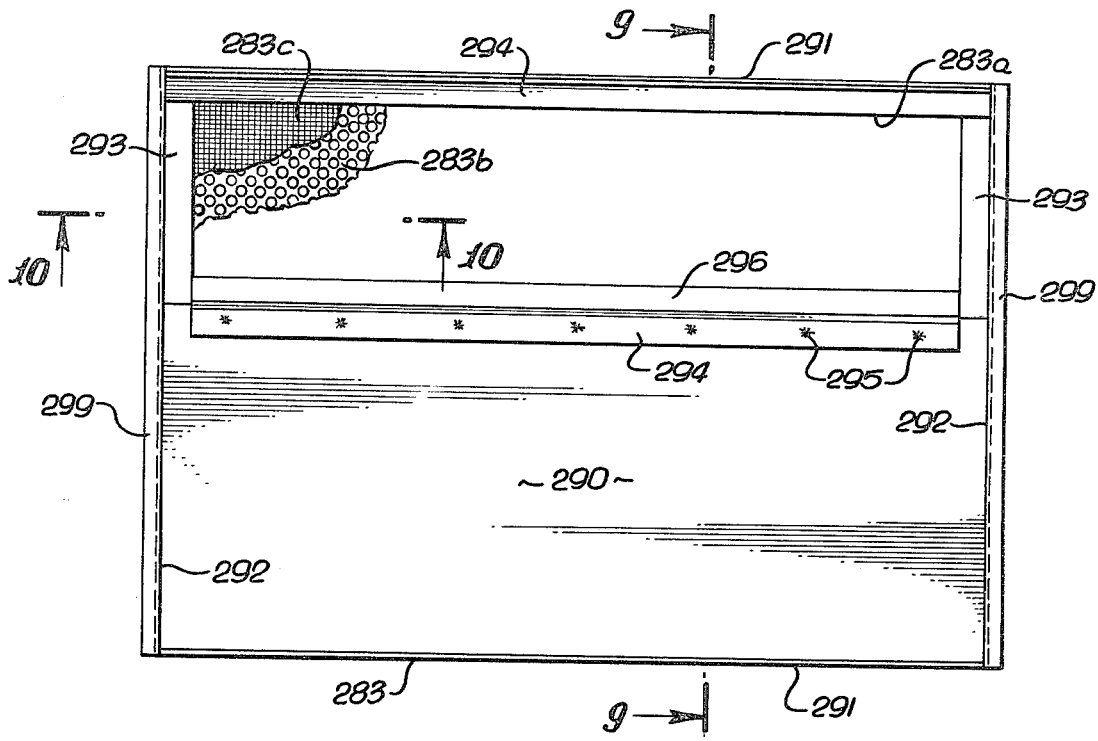
FIG. 8 is a top plan of an air distribution panel.
Figure 9:
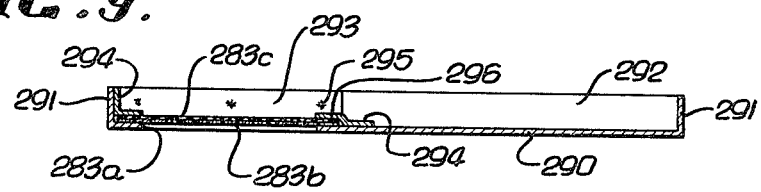
FIG. 9 is a transverse section on the line 9—9 of FIG. 8.
Figure 10:
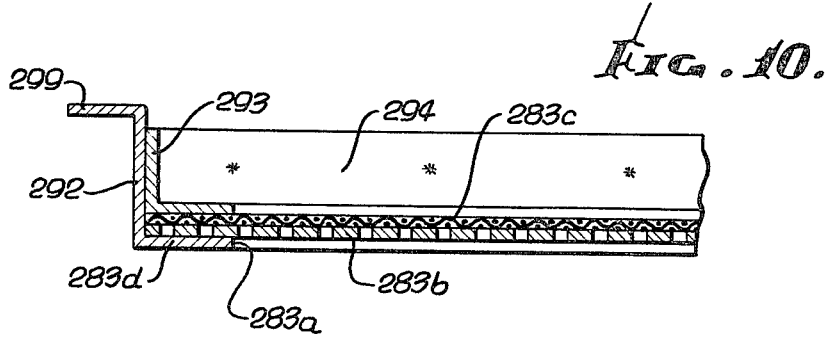
FIG. 10 is an enlarged fragmentary section on the line 10—10 of FIG. 8.

Air distribution panels 283 are constructed as shown in FIGS. 8, 9, and 10. Each of the panels 283 is fabricated from sheet metal components which support over a selected area opening 283a a lower perforated plate 283b covered by a screen 283c. The panels are of selected length and of a width bridging the supporting shoulder 286 and 287, as seen in FIG. 6. As shown, each air distribution panel 283 comprises a tray-like body having a bottom wall 290 and upstanding marginal walls 291, along its longitudinal side edges, and upstanding walls 292 at its respective ends. The rectangular opening 283a extends approximately the length of the bottom 290 and approximately one-third the width of the body along one side wall 291 thereof, and when the panels are installed on the support ledges 286 and 287 the opening 283a is located adjacent to the inner or dividing wall 290 between the makeup air hood and the exhaust hood sections of the hood structure. For purposes of assembly of the perforated plate 283 and the screen 283c over the rectangular opening 283a, the plate is placed within the tray-like structure, resting on the bottom thereof and spanning the opening, and thereafter the screen fabric 283c is placed over the perforated plate. End angle members 293 and an elongated side angle member 294 are then placed in overlying relation to the screen and suitably secured to the respective end walls 292 and the side wall 291, as by means of spot welding at appropriate locations as indicated at 295, with the base of the angle members clamping the screen fabric 283c against the plate 283b and the plate 283b clamped against a ledge 283d formed about the periphery of the opening 283a. An elongated clamping member 294 extends along the inner edge of the opening 283a and is welded or fastened at 295 to the bottom 290 of the panel. This clamping member has a lip or portion 296 overlying the screen fabric and plate to clamp them against the bottom of the panel.

It has been found that the best results in terms of efficient air distribution along the length of the makeup air plenum is accomplished when the plate 283b is perforated with holes providing an open area of about or slightly in excess of 53% of the total plate area and then covering the openings with the screen fabric 283c using typical aluminum screen fabric to partially occlude the openings.

The panel 283 as seen in FIGS. 8 through 10 has along each end wall 292 an outstanding end flange 299 spanning the width of the end wall 292. Alternate panels are constructed without such end flanges. In practice, when the air distribution panels are removably placed on the ledges 286 and 287, within the makeup air plenum, as seen in FIG. 7, the alternate air distribution panels 283 have their end flanges 299 overlapping the adjacent end of the panels at opposite ends thereof. In addition, air distribution panels air constructed having only one end flange 299, as seen at the respective opposite ends of the series of panels in FIG. 7, for overlapping engagement with the respective adjacent panels but enabling the other end of the end panels to rest upon a support bracket or ledge 300. These overlapping end flanges prevent the flow of air downwardly between the adjacent air distribution panels.

Figure 11:
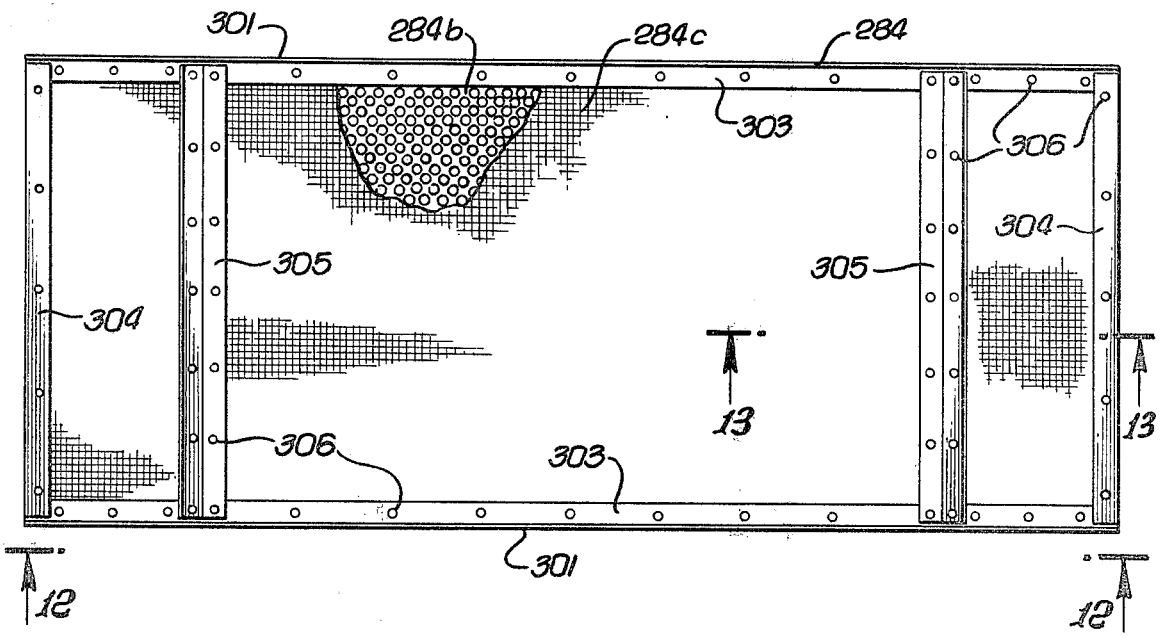
FIG. 11 is a top plan of the makeup air diffuser.
Figure 12:
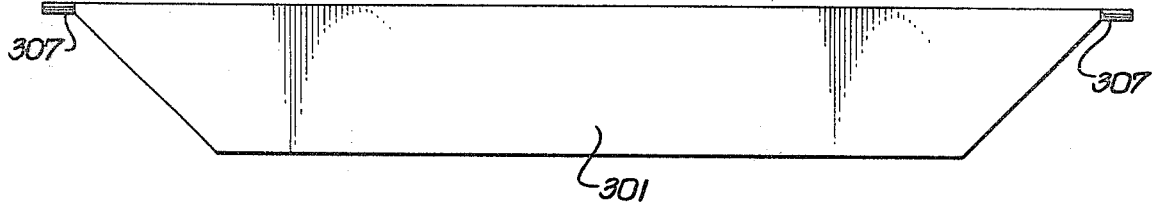
FIG. 12 is a side elevation of the makeup air diffuser of FIG. 11.
Figure 13:
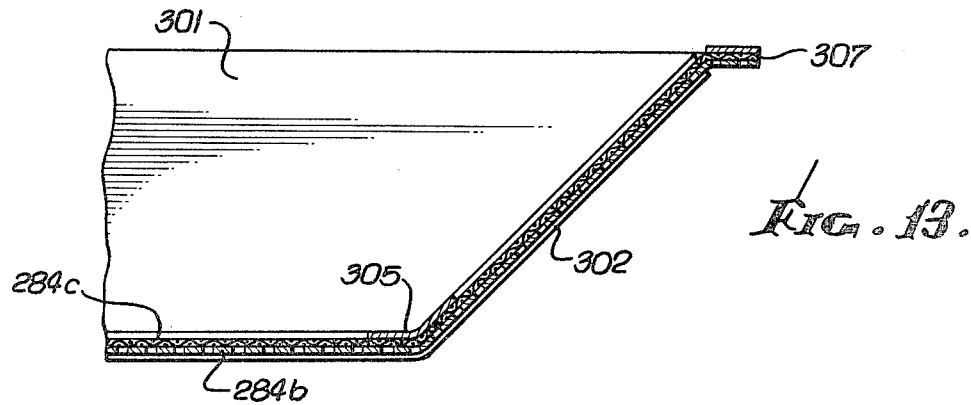
FIG. 13 is an enlarged fragmentary section on the line 13—13 of FIG. 11.

Referring to FIGS. 11, 12, and 13, the structure of the air diffuser 284 is illustrated. The air diffuser is a fabricated structure employing a sheet metal supporting frame structure, a lower perforated plate 284b and an overlying woven screen fabric 284c. The frame structure is trough-like in shape and includes imperforate side walls 301 having an in-turned flange 302 along the ends and bottom thereof, on which the correspondingly shaped plate 284b and screen 284c rest, being clamped thereto by side clamping strips 303, end clamping strips 304, and bottom, angle strips 305, all appropriately secured together as by riveting or welding at 306 to form a rigidized diffuser structure providing outstanding end flanges 307 suitably supportable beneath the makeup air duct 80 leading to the makeup air plenum 282, with the angularly disposed ends of the diffuser facing in opposite directions longitudinally of the hood structure. It will be appreciated that the diffuser structure herein illustrated is adapted to be disposed directly beneath a makeup air duct entering the plenum between the ends of the plenum, but, in the event that the diffuser 284 is to be employed in association with a hood structure extending longitudinally from a building wall, with the makeup air duct at one end of the hood structure, then the diffuser 284 may be formed with a right angular end for reception in such an installation.

Figure 14:
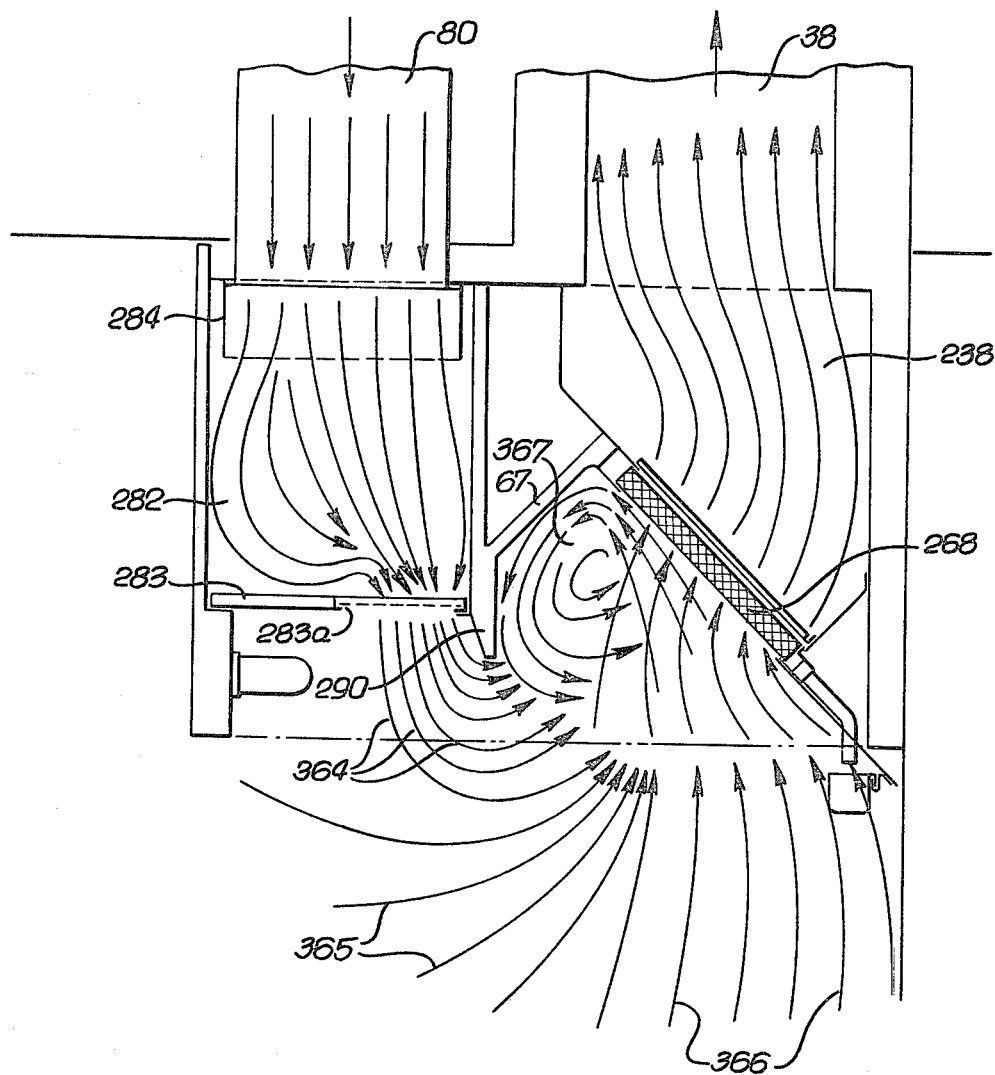
FIG. 14 is a diagramatic view illustrating the air currents in the improved ventilation system of FIG. 6.

In the operation of the hood structure, as diagrammatically illustrated in FIG. 14, makeup air is supplied from the external source through the makeup duct 80 and enters the makeup air plenum 282 through the diffuser structure 284. This diffuser causes the air to be diffused longitudinally of the makeup air hood towards the ends thereof as well as downwardly beneath the inlet duct. The air distribution panels 283, which form the lower wall of the plenum 282, sufficiently restrict the flow of makeup air from the plenum to the panels that the air pressure within the makeup air plenum is pressurized throughout the length thereof and ultimately exits through the panel openings 283a, primarily in the longitudinally extended region closely adjacent the intermediate barrier wall 290, as indicated by the arrows 364. At the same time, air is being exhausted through the longitudinally extended row of grease filters 268 into the exhaust duct 38. As indicated by the arrows 365, a certain portion of the exhaust air is derived from the room, and as indicated by the arrows 366 a certain portion of the exhaust air is made up by air contaminated by the cooking activities below the hood. The air flow causes a low pressure region just below the intermediate barrier wall 290, and in the vortex chamber 367 defined between the filter 268, the baffle wall 67, and the adjacent side of the intermediate barrier wall 290, such contaminated air as does not pass through the filter 268 is caused to recycle and combine with the makeup air supplied from the exterior and again be circulated back towards the filters 268 for passage therethrough. As is indicated by the arrows 264, the creation of a low-pressure zone just below the intermediate barrier wall 290 results in turning of the exterior makeup air flow horizontally and into the vortex chamber just below the lower ledge of the barrier wall 290. In other words, as the warm contaminated air rises from the cooking area and is rapidly drawn to the negative pressure area of the exhaust cavity, the movement of such warmed air is in part generally parallel to the plane of the filters 268, and mixing of the contaminated air with the makeup air, both from the external source and from the room, and travelling in a direction generally perpendicular to the filters, will cause the contaminated air, for the most part, to be exhausted through the filters. However, any contaminated air the direction of which is not changed upon mixing with the makeup air is recycled through the vortex chamber 267 and mixed with makeup air and then redirected to the filters in a generally perpendicular direction.

With the hood structure described above, the makeup air delivery and the exhaust air capacity are complementary and there are few static areas. An increase in the makeup air delivery or the exhaust capacity or a reduction therein results in a corresponding increase of or reduction in the other, so that the only change necessary to balance the system to suit a given installation is to vary the speed of one of the fans.

We claim:

1. In a ventilating hood structure for use above a cooking area: a horizontally extended makeup hood; a horizontally extended exhaust hood; a longitudinally extended divider wall between said hoods; means forming an inlet for conducting makeup air into said air hood; means forming an outlet for exhaust air from said exhaust hood; said makeup hood having a lower makeup air distribution means extending longitudinally within said makeup hood and disposed above the bottom of said divider wall; makeup air diffusing means at said inlet disposed in said makeup hood above and spaced from said air distribution means; said makeup hood having walls defining a makeup plenum with said divider wall, air distribution means and air diffusing means; said air distribution means being constructed to restrict the flow of makeup air from said makeup air plenum to maintain a positive pressure in said makeup air plenum causing equal distribution of makeup air throughout the length of side makeup air plenum; said exhaust hood having filter means extending longitudinally and facing said divider wall and having walls defining with said filter means an exhaust plenum communicating with said outlet; air flowing through said air distribution means discharging downwardly along said divider wall to a region below its lower end and then turning toward said exhaust hood.

2. In a ventilating hood structure as defined in claim 1; said filter means facing said divider wall at an angle inclined downwardly and away from said divider wall and forming a vortex chamber with said divider wall above said bottom thereof.

3. In a ventilating hood structure as defined in claim 1; said air distribution means including a longitudinally extended air flow restricting section extending alongside said divider wall.

4. In a ventilating hood structure as defined in claim 1; said filter means facing said divider wall at an angle inclined downwardly and away from said divider wall and forming a vortex chamber with said divider wall above said bottom thereof, said air distribution means including a longitudinally extended air flow restricting section extending alongside said divider wall.

5. In a ventilating hood structure as defined in claim 1; said air distribution means being panels removably supported by said divider wall and an opposing other wall.

6. In a ventilating hood structure as defined in claim 1; said air distribution means including a perforated plate and a screen fabric disposed one above the other.

7. In a ventilating hood structure as defined in claim 1; said air distribution means being panels removably supported by said divider wall and an opposing other wall, said panels having an opening therethrough, and a perforated plate and a screen fabric one above the other bridging said opening.

8. In a ventilating hood structure as defined in claim 1; said air distribution means being panels removably supported by said divider wall and an opposing other wall, said panels having an opening therethrough, and a perforated plate and a screen fabric above said plate bridging said opening.

9. In a ventilating hood structure as defined in claim 1; said air distribution means being panels removably supported by said divider wall and an opposing other wall, said panels having an opening therethrough, and a perforated plate and a screen fabric one above the other bridging said opening, said opening extending longitudinally of said panels adjacent to said divider wall.

10. In a ventilating hood structure as defined in claim 1; said air diffusing means including a perforated plate and a screen fabric.

11. In a ventilating hood structure as defined in claim 1; said air diffusing means including a perforated plate and a screen fabric, and support means clamping said plate and screen fabric together.

12. In a ventilating hood structure as defined in claim 1; said air diffusing means including a perforated plate and a screen fabric, and support means clamping said plate and screen fabric together, with said screen fabric upstream of said perforated plate.

13. In a ventilating hood structure as defined in claim 1; said inlet opening into the top of said makeup air plenum, and said air diffusing means having diffusing structure facing downwardly towards said air distribution means and longitudinally of said makeup air plenum.

14. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall.

15. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall, said filter means facing said divider wall at an angle inclined downwardly and away from said divider wall and forming a vortex chamber with said divider wall.

16. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall, said air diffusing means and said air distribution means comprising air flow restricting structure including a perforated plate and a screen fabric.

17. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall, said air distribution means being panels removably supported by said divider wall and an opposing other wall.

18. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall, said air diffusing means and said air distribution means comprising air flow restricting structure including a perforated plate and a screen fabric, upstream of and clamped against said perforated plate.

19. In a ventilating hood structure as defined in claim 1; said inlet opening into the top of said makeup air plenum, and said air diffusing means having diffusing structure facing downwardly towards said air distribution means and longitudinally of said makeup air plenum, said air distribution means including a longitudinally extended air flow restricting section extending alongside said divider wall, said air diffusing means and said air distribution means comprising air flow restricting structure including a perforated plate and a screen fabric, said filter means facing said divider wall at an angle inclined downwardly and away from said divider wall and forming a vortex chamber with said divider wall.

20. In a room ventilating system: an elongated makeup air hood structure and an elongated exhaust air hood structure disposed in side-by-side horizontally extended relation; a vertical divider wall between said hood structures having a lower edge within said hood structure; makeup air supply means for forcing makeup air from outside the room into said makeup air hood, including a duct opening into the top of said makeup air hood structure; means for forcing exhaust air from said exhaust hood structure, including an exhaust duct; said makeup air hood structure having walls forming an elongated makeup air plenum, including air distribution panel means forming a lower wall of said plenum and having air flow restricting means extending along said divider wall above the bottom thereof to maintain a positive pressure in said makeup air plenum causing equal distribution of makeup air throughout the length of said makeup air plenum; makeup air diffusor screen means in said makeup hood structure above and spaced from said air distribution panel; said air diffusor screen means forming an upper portion of said plenum for directing makeup air along the length of said makeup air plenum; said exhaust air hood structure having walls defining an exhaust air plenum; including filter screen means opposed to said divider wall and forming an elongated angular space to cause a vortex in the flow of makeup air under the lower edge of said divider wall, air flowing through said distribution panel discharging downwardly along said divider wall to a region below its lower end and then turning towards the exhaust hood to mix with air from the room, the mixture passing through said filter screen means.

* * * * *